(12) United States Patent
Nishio et al.

(10) Patent No.: US 7,585,934 B2
(45) Date of Patent: Sep. 8, 2009

(54) PROCESS FOR PRODUCING POLYETHER POLYMER COMPOSITION, POLYETHER POLYMER COMPOSITION, AND SOLID ELECTROLYTE FILM

(75) Inventors: Hideyuki Nishio, Tokyo (JP); Hidenori Onishi, Tokyo (JP)

(73) Assignee: Zeon Corporation, Tokyo (JP)

( * ) Notice: Subject to any disclaimer, the term of this patent is extended or adjusted under 35 U.S.C. 154(b) by 7 days.

(21) Appl. No.: 10/536,986

(22) PCT Filed: Nov. 28, 2003

(86) PCT No.: PCT/JP03/15250

§ 371 (c)(1),
(2), (4) Date: Mar. 17, 2006

(87) PCT Pub. No.: WO2004/050747

PCT Pub. Date: Jun. 17, 2004

(65) Prior Publication Data

US 2006/0199939 A1 Sep. 7, 2006

(30) Foreign Application Priority Data

Nov. 29, 2002 (JP) ............................ 2002-348255
Nov. 29, 2002 (JP) ............................ 2002-348330

(51) Int. Cl.
*C08G 65/34* (2006.01)
(52) U.S. Cl. .................................................... 528/425
(58) Field of Classification Search ................. 528/125, 528/425
See application file for complete search history.

(56) References Cited

U.S. PATENT DOCUMENTS

| | | | | | |
|---|---|---|---|---|---|
| 4,874,825 | A | * | 10/1989 | Gergen | ........................ 525/425 |
| 5,609,795 | A | * | 3/1997 | Matsumoto et al. | ......... 252/500 |
| 5,654,393 | A | * | 8/1997 | Kemmish et al. | ............ 528/125 |
| 5,658,687 | A | * | 8/1997 | Takeda et al. | ................ 429/317 |
| 5,830,974 | A | * | 11/1998 | Schmidhauser et al. | ...... 528/125 |
| 5,840,809 | A | * | 11/1998 | Ohtsuka et al. | .............. 525/316 |
| 5,968,681 | A | * | 10/1999 | Miura et al. | ................. 429/122 |
| 6,077,627 | A | * | 6/2000 | Bauerlein | .................... 429/309 |
| 6,180,287 | B1 | * | 1/2001 | Watanabe et al. | ............ 429/312 |
| 6,235,866 | B1 | * | 5/2001 | Khouri et al. | ................ 528/125 |
| 6,287,411 | B1 | * | 9/2001 | Kelley et al. | ................ 156/327 |
| 6,576,692 | B1 | * | 6/2003 | Ohtsuka et al. | ............. 524/151 |
| 6,620,879 | B1 | * | 9/2003 | Albrecht et al. | ............. 524/522 |
| 6,673,273 | B2 | * | 1/2004 | Ba Le et al. | ................. 252/511 |
| 6,773,810 | B2 | * | 8/2004 | Sen et al. | ..................... 428/370 |
| 6,849,706 | B1 | * | 2/2005 | Brunelle et al. | ............. 528/170 |
| 6,939,383 | B2 | * | 9/2005 | Eastin et al. | ................ 29/623.1 |
| 6,949,285 | B1 | * | 9/2005 | Tobinaga et al. | ......... 428/317.9 |
| 7,125,953 | B2 | * | 10/2006 | Lockley et al. | .............. 528/480 |
| 7,241,835 | B2 | * | 7/2007 | O'Brien et al. | ............. 524/862 |
| 2001/0006677 | A1 | * | 7/2001 | Mcginity et al. | ............. 424/449 |
| 2002/0034689 | A1 | * | 3/2002 | Hoshida et al. | ............. 429/254 |
| 2002/0045685 | A1 | * | 4/2002 | Ogoe et al. | .................... 524/35 |
| 2002/0103327 | A1 | * | 8/2002 | Claub et al. | ................. 528/125 |
| 2002/0128364 | A1 | * | 9/2002 | Michot et al. | ............... 524/401 |
| 2003/0044688 | A1 | * | 3/2003 | Kang et al. | ................. 429/317 |
| 2003/0091898 | A1 | * | 5/2003 | Dexter et al. | ................. 429/209 |
| 2003/0094599 | A1 | * | 5/2003 | Le et al. | ...................... 252/500 |
| 2003/0108799 | A1 | * | 6/2003 | Lascaud et al. | ............. 429/316 |
| 2003/0165743 | A1 | * | 9/2003 | Horikiri et al. | .............. 429/300 |
| 2003/0170546 | A1 | * | 9/2003 | Boon et al. | ................. 429/317 |
| 2004/0007688 | A1 | * | 1/2004 | Awano et al. | .............. 252/62.2 |
| 2004/0023114 | A1 | * | 2/2004 | Sada et al. | ................. 429/231.4 |
| 2005/0048236 | A1 | * | 3/2005 | Watkins et al. | ............. 428/35.7 |
| 2006/0040196 | A1 | * | 2/2006 | Yano et al. | ................ 430/109.1 |

FOREIGN PATENT DOCUMENTS

| | | |
|---|---|---|
| JP | 63-136407 A | 6/1988 |
| JP | 8-188653 A | 7/1996 |
| JP | 2000-123632 A | 4/2000 |
| WO | WO 0184659 A1 * | 11/2001 |
| WO | WO 03002669 A1 * | 1/2003 |

* cited by examiner

*Primary Examiner*—Mark Eashoo
*Assistant Examiner*—Liam J Heincer
(74) *Attorney, Agent, or Firm*—Birch, Stewart, Kolasch & Birch, LLP

(57) ABSTRACT

A process for producing a polyether polymer composition, comprising incorporating an antioxidant insoluble in an organic solvent and/or a stabilizer soluble in the organic solvent, in a slurry containing a polyether polymer and the organic solvent to disperse or dissolve the antioxidant and/or stabilizer; and then, removing the organic solvent. Also provided a polyether polymer composition comprising a polyether polymer particle, and an antioxidant insoluble in an organic solvent incapable of dissolving the polymer particle, and/or a stabilizer soluble in the organic solvent; and satisfying at least one of the following requirements: (1) most of the antioxidant is deposited on the surface of polymer particle; (2) the polymer has a gel content of not larger than 5% by weight; and (3) most of the stabilizer exists within the polymer particle. The polymer composition produced by the above-mentioned process and the polymer composition satisfying the requirements (1), (2) and (3) give a solid electrolyte film having good mechanical properties.

11 Claims, No Drawings

PROCESS FOR PRODUCING POLYETHER POLYMER COMPOSITION, POLYETHER POLYMER COMPOSITION, AND SOLID ELECTROLYTE FILM

TECHNICAL FIELD

This invention relates to a composition comprising a polyether polymer and an antioxidant, a process for producing the composition, and a solid electrolyte film shaped from the composition.

BACKGROUND ART

Polyether polymers such as polyethylene oxide and polypropylene oxide exhibit a high ionic conductivity when an electrolyte salt compound is incorporated therein. Therefore, polyether polymers are known as a material suitable for a solid polymer electrolyte. Especially a solid polymer electrolyte film made of a polyether polymer is used for a lithium ion battery.

For example, a proposal has been made in Japanese Unexamined Patent Publication No. S63-136407 wherein an ethylene oxide-propylene oxide copolymer having mixed therewith an alkali metal salt is used as an ionic conductive solid electrolyte. More specifically it is described in the patent publication that a film exhibiting a high ionic conductivity is made by a process wherein a solution of an ethylene oxide-propylene oxide copolymer and $LiCF_3SO_3$ in acetonitrile is cast into a film and then acetonitrile is removed from the as-cast film in a stream of inert gas and under a reduced pressure.

As polymer batteries have spread wide in recent years, it is required to produce solid polymer electrolyte films with enhanced industrial productivity. However, polyether polymers are generally subject to molecular weight degradation due to polymer molecule scission. That is, the molecular weight of the polymer is easily reduced, for example, while the polymer is stored as a material for shaping, or when the polymer is melt-extruded into a film or the polymer is molded. Therefore a film having a high mechanical strength is difficult to obtain. To solve this problem, the present inventors made an attempt for incorporating an antioxidant in a polyether polymer when the polymer is melt-extruded into a film, but it was difficult or even impossible to suppress the reduction of molecular weight to a desired extent.

A proposal has been made, for example, in Japanese Unexamined Patent Publication No 2000-123632 wherein ethylene oxide and propylene oxide are copolymerized together with ally glycidyl ether, and a resulting copolymer is crosslinked with a peroxide to prepare a crosslinked copolymer capable of giving a film having high ionic conductivity, good flexibility and high mechanical strength. However, the present inventors have confirmed that the polyether copolymer is undesirably crosslinked to be thereby partially gelled while the copolymer is stored before the melt-extrusion for film-formation, and therefore the copolymer is difficult to shape, and, even if the copolymer can be shaped, a resulting film has poor mechanical properties.

DISCLOSURE OF THE INVENTION

An object of the present invention is to provide a polyether polymer composition which is neither subject to the reduction of molecular weight due to polymer chain scission, nor readily gelled, while the polymer composition is stored for a long period as a material for forming a solid electrolyte film, or when the polymer composition is shaped into a film, for example, by a melt-extrusion procedure.

Another object of the present invention is to provide a process for producing the above-mentioned polyether polymer composition in an advantageous manner.

A further object of the present invention is to provide a solid polymer electrolyte having good mechanical properties and exhibiting high ionic conductivity.

To achieve the above-mentioned objects, the present inventors made extensive research on a procedure for incorporating an antioxidant in a polyether polymer, and found that a polyether polymer composition, which is not subject to the molecular weight reduction while the polymer composition is stored for a long period and when the composition is shaped into a film, for example, by a melt-extrusion procedure, can be obtained by a procedure wherein an antioxidant which is insoluble in an organic solvent is incorporated in a slurry comprising the organic solvent and a polyether polymer dispersed therein; and then, the organic solvent is removed from the slurry.

Further, the present inventors made extensive research on a procedure of incorporating a stabilizer in a polyether polymer, and found that a polyether polymer composition, which is not readily gelled while the polymer composition is stored for a long period and when the polymer composition is shaped into a film, for example, by a melt-extrusion procedure, can be obtained by a procedure wherein a stabilizer which is soluble in an organic solvent is incorporated in a slurry comprising the organic solvent and a polyether polymer dissolved therein; and then, the organic solvent is removed from the slurry.

The present inventors further found that the polyether polymer composition having incorporated therein an antioxidant and/or a stabilizer by the above-mentioned procedures gives a solid polymer electrolyte exhibiting good mechanical properties and high ionic conductivity. Thus, the present invention has been completed based on the above-mentioned findings.

In a first aspect of the present invention, there is provided a process for producing a polyether polymer composition, characterized in that at least one kind of agent selected from an antioxidant which is insoluble in an organic solvent and a stabilizer which is soluble in the organic solvent is incorporated in a slurry comprising the organic solvent and a polyether polymer dispersed therein; and then, the organic solvent is removed from the slurry.

In a second aspect of the present invention, there is provided a polyether polymer composition, characterized by obtainable by a process wherein at least one kind of agent selected from an antioxidant which is insoluble in an organic solvent and a stabilizer which is soluble in the organic solvent is incorporated in a slurry comprising the organic solvent and a polyether polymer dispersed therein to prepare a slurry having said agent dispersed or dissolved therein; and then, the organic solvent is removed from the slurry.

In a third aspect of the present invention, there is provided a polyether polymer composition comprising a polyether polymer particle, and at least one kind of agent selected from an antioxidant which is insoluble in an organic solvent incapable of dissolving the polyether polymer particle therein, and a stabilizer which is soluble in the organic solvent, characterized in that the polyether polymer composition satisfies at least one of the following three requirements:

(1) at least 50% by weight of the total amount of the antioxidant in the composition is deposited on the surface of the polyether polymer particle,
(2) the polyether polymer has a gel content of not larger than 5% by weight, and (3) at least 50% by weight of the total amount of the stabilizer in the composition exists within the polyether polymer particle.

In a fourth aspect of the present invention, there is provided a solid electrolyte film comprised of the polyether polymer composition as described above with respect to the second and third aspects of the present invention, and an electrolyte salt compound which is soluble in the polyether polymer composition.

BEST MODE FOR CARRYING OUT THE INVENTION

Process for Producing Polyether Polymer Composition

The process for producing a polyether polymer composition according to the present invention is characterized in that at least one kind of agent selected from an antioxidant which is insoluble in an organic solvent and a stabilizer which is soluble in the organic solvent is incorporated in a slurry comprising the organic solvent and a polyether polymer dispersed therein; and then, the organic solvent is removed from the slurry.

The polyether polymer is not particularly limited provided that it comprises oxyalkylene repeating units as the main structural units. This polyether polymer can be prepared with a high efficiency from an oxirane monomer or monomers by a slurry polymerization procedure in an organic solvent incapable of dissolving the polyether polymer. A polymer slurry as-obtained by the slurry polymerization procedure can be used as a "slurry comprising an organic solvent and a polyether polymer dispersed therein" in the process for producing a polyether polymer composition according to the present invention.

The kind of oxirane monomer or monomers as used for the slurry polymerization is not particularly limited, but preferably the oxirane monomer or monomers comprises an ethylene oxide monomer (a) as at least one oxirane monomer ingredient. More specifically the oxirane monomer or monomers preferably comprise 70 to 99% by mole of an ethylene oxide monomer (a) and 30 to 1% by mole of other oxirane monomer (b) copolymerizable with the ethylene oxide monomer (a).

When the amount of ethylene oxide monomer (a) in the oxirane monomer or monomers is too small, a polyether polymer prepared from the oxirane monomer or monomers tends to give a solid polymer electrolyte film having poor mechanical properties. In contrast, when the amount of ethylene oxide monomer (a) is too large, a polyether polymer prepared from the oxirane monomer or monomers tends to give a solid polymer electrolyte film having low ionic conductivity, and a battery with the electrolyte is liable to have poor battery performance.

The oxirane monomer (b) copolymerizable with ethylene oxide monomer (a) includes alkylene oxides having 3 to 20 carbon atoms, glycidyl ethers having 4 to 10 carbon atoms, an oxide of aromatic vinyl compounds, and crosslinking oxirane monomers which are prepared by introducing crosslinking groups into these oxirane monomers.

The oxirane monomer (b) copolymerizable with ethylene oxide monomer (a) may be used either alone or as a combination of at least two kinds thereof. The oxirane monomer (b) used in the present invention preferably includes as at least one ingredient thereof an alkylene oxide having 3 to 20 carbon atoms and/or a glycidyl ether having 4 to 10 carbon atoms. Of these, an alkylene oxide having 3 to 20 carbon atoms is especially preferable, and, as specific examples thereof, there can be mentioned propylene oxide and 1,2-epoxybutane.

The oxirane monomer (b) used in the present invention may comprise as at least one ingredient thereof a crosslinking oxirane monomer according to the need. In the case when a resulting polyether polymer composition is used for an ionic conductive electrolyte film for a battery, a crosslinking oxirane monomer is preferably used. The crosslinking oxirane monomer includes oxirane monomers such as the above-mentioned alkylene oxide having 3 to 20 carbon atoms and glycidyl ether having 4 to 10 carbon atoms, into which crosslinking groups have been introduced. Crosslinking oxirane monomers having a crosslinking group capable of forming crosslinks by irradiation with light or reaction with a peroxide, such as a vinyl, hydroxyl or acid anhydride group, are especially preferable. Of these, an a crosslinking oxirane monomer having a vinyl group is most preferable.

The crosslinking oxirane monomer having a vinyl group includes, for example, ethylenically unsaturated glycidyl ethers, monoepoxides of diene or polyene, alkenyl epoxides, and glycidyl esters of an ethylenically unsaturated carboxylic acid. Of these, ethylenically unsaturated glycidyl ethers are especially preferable, and, as specific examples thereof, there can be mentioned vinyl glycidyl ether and allyl glycidyl ether.

In combination with the above-mentioned crosslinking oxirane monomer capable of forming crosslinks by irradiation with light or reaction with a peroxide, a halogen-containing oxirane monomer, i.e., epihalohydrin, such as epichlorohydrin or epibromohydrin may be used in the present invention.

In the case when the oxirane monomer (b) used in the present invention contains a crosslinking oxirane monomer, especially those which are capable of forming crosslinks by irradiatiuon with light or reaction with a peroxide, a resulting polyether polymer can be easily cured by, for example, irradiation with ultraviolet rays, or by heating. When the oxirane monomer (b) contains a crosslinking oxirane monomer, the content of crosslinking oxirane monomer is usually not larger than 9% by mole, preferably not larger than 7% by mole and more preferably not larger than 5% by mole.

As a polymerization catalyst used for the slurry polymerization, publicly known ring-opening polymerization catalysts can be used. As specific examples of the ring-opening polymerization catalysts, there can be mentioned a catalyst prepared by allowing an organoaluminum to react with water and acetyl acetone (Japanese Examined Patent Publication No. S35-15797), a catalyst prepared by allowing triisobutylaluminum to react with phosphoric acid and triethylamine (Japanese Examined Patent Publication No. S46-27534), and a catalyst prepared by allowing triisobutylaluminum to react with an organic acid salt of diazabicycloundecene and phosphoric acid (Japanese Examined Patent Publication No. S56-51171). Of these, a catalyst prepared by allowing triisobutylaluminum to react with an organic acid salt of diazabicycloundecene and phosphoric acid is preferable because undesirable formation of a gel can be suppressed.

The organic solvent used for dispersing the polyether polymer is not particularly limited provided that the polyether polymer is insoluble in the organic solvent. In the case when a slurry polymerization procedure is adopted, the organic solvent is preferably such that the oxirane monomer or monomers are soluble therein, a polymerization catalyst is not deactivated, and the resulting polyether polymer is not soluble and precipitates. As specific examples of the organic solvent, there can be mentioned chain-like saturated hydrocarbons such as n-pentane and n-hexane, and alicyclic hydrocarbons such as cyclopentane and cyclohexane. Of these, chain-like saturated hydrocarbons are preferable.

When the above-mentioned oxirane monomer or monomers are polymerized in the organic solvent by a conventional method, a slurry containing a polyether polymer dispersed in the organic solvent is obtained.

The thus-obtained polyether polymer has a gel content of not larger than 5% by weight, preferably not larger than 3% by weight and especially preferably not larger than 1% by weight. When the content of gel in the polyether polymer is too large, the polyether polymer is often difficult to shape into a solid polymer electrolyte film, and the resulting solid polymer electrolyte film is liable to have poor mechanical properties. By the term "gel content" in the polyether polymer as used herein, we mean the content of a crosslinked product formed in the polyether polymer, and the gel content can be determined by measuring the content of toluene-insoluble matter.

The polyether polymer obtained by the above-mentioned procedure preferably has a weight average molecular weight (Mw) in the range of 100,000 to 1,500,000, more preferably 150,000 to 1,000,000, and especially preferably 200,000 to 600,000. If the weight average molecular weight of polyether polymer is too small, a resulting solid electrolyte film is liable to have poor flexibility and poor mechanical properties. In contrast, if the weight average molecular weight of polyether polymer is too large, a resulting solid electrolyte film is liable to have low ionic conductivity.

The molecular weight distribution of polyether polymer, as expressed by a Mw/Mn ratio (Mn: number average molecular weight), is preferably in the range of 1.5 to 13, more preferably 1.6 to 12 and especially preferably 1.7 to 11.

In the process of the present invention, an insoluble antioxidant and/or a soluble stabilizer is incorporated in a slurry containing the polyether polymer dispersed in an organic solvent.

The insoluble antioxidant used in the process of the present invention includes those which are generally used as antioxidants for rubber. The insoluble antioxidant is not particularly limited provided that it is capable of suppressing the reduction of molecular weight due to polymer chain scission occurring in the process for the production of the polyether polymer composition, during storage thereof and at the step of processing or shaping thereof, and further that the antioxidant is insoluble in the organic solvent contained in the polymer slurry.

As specific examples of the antioxidant satisfying the above-mentioned requirements, there can be mentioned hindered phenol antioxidants such as 4,4'-thiobis(6-tert-butyl-m-cresol) and 4,4'-butylidenebis(6-tert-butyl-m-cresol); amine-ketone antioxidants such as 2,2,4-trimethyl-1,2-dihydroquinone-polymerized product and 6-ethoxy-1,2-dihydro-2,2,4-trimethylquinoline; aromatic secondary amine antioxidants such as N-phenyl-N'-isopropyl-p-phenylenediamine and N,N'-di-2-naphthyl-p-phenylenediamine; and benzimidazole antioxidants such as 2-mercaptomethylbenzimidazole. Of these, hindered phenol antioxidants are preferable because of enhanced effect of suppressing the molecule chain scission of polyether polymer. 4,4'-Thiobis(6-tert-butyl-m-cresol) and 4,4'-butylidenebis(6-tert-butyl-m-cresol) are especially preferable.

The above-mentioned insoluble antioxidants may be used either alone or as a combination of at least two kinds thereof. The amount of antioxidant to be dispersed in the polymer slurry is preferably in the range of 0.05 to 2% by weight, more preferably 0.07 to 1.5% by weight and especially preferably 0.1 to 1.2% by weight, based on the total weight of the polyether polymer in the slurry. If the amount of antioxidant to be dispersed in the polymer slurry is too small, the polyether polymer tends to be subject to the molecular weight reduction during storage and at shaping.

The soluble stabilizer used in the process of the present invention has a function of suppressing the gelation of polyether polymer composition occurring in the process for the production of the polyether polymer composition, during storage thereof and at the step of processing or shaping thereof. Especially the soluble stabilizer exhibits a marked function of suppressing the gelation of a polyether polymer having crosslinking monomer units introduced therein by copolymerization, which polymer is suitable for an ionic conductive solid electrolyte film for battery.

The soluble stabilizer used in the process of the present invention includes those which are generally used as a stabilizer for rubber, and the kind thereof is not particularly limited provided that it is capable of suppressing the gelation of polymer and is soluble in the organic solvent contained in the polymer slurry.

The stabilizer satisfying the above-mentioned requirements preferably includes, for example, cyclic amidine salts, hindered phenol compounds, phosphorous acid ester compounds, and fatty acids having at least 5 carbon atoms.

As specific examples of the cyclic amidine, there can be mentioned 1,4-diazabicyclo-(2,2,2)octane, 1,6-diazabicyclo-(3,4,0)nonene-5 and 1,8-diazabicyclo-(5,4,0)undecene-7. In the present invention, these cyclic amidines are used as organic acid salts such as oleic acid, octylic acid and 2-ethylhexanoic acid. Of these, an oleic acid salt of 1,8-diazabicyclo-(5,4,0)undecene-7 is preferably used.

As specific examples of the hindered phenol compounds, there can be mentioned octadecyl-3-(3,5-di-tert-butyl-4-hydroxyphenyl) propionate, 2,6-di-tert-butyl-p-cresol, 4,6-bis (octylthiomethyl)-o-cresol, 2,6-di-tert-butyl-4-(4,6-bis(octylthio)-1,3,5-triazin-2-ylamino)phenol and 2,2'-methylenebis(4-methyl-6-tert-butylphenol). Of these, octadecyl-3-(3,5-di-tert-butyl-4-hydroxyphenyl) propionate and 4,6-bis(octylthiomethyl)-o-cresol are preferable.

As specific examples of the phosphorous acid ester compounds, there can be mentioned tridecyl phosphite and tris (nonylphenyl) phosphite. Of these, tridecyl phosphite is preferable.

As specific examples of the fatty acid having at least 5 carbon atoms, there can be mentioned myristic acid, palmitic acid, stearic acid, lauric acid, linoleic acid and oleic acid. Of these, myristic acid is preferable.

The above-mentioned soluble stabilizer may be used either alone or as a combination of at least two kinds thereof. The amount of stabilizer to be dispersed in the polymer slurry is preferably in the range of 0.05 to 2% by weight, more preferably 0.07 to 1.5% by weight and especially preferably 0.1 to 1.2% by weight, based on the total weight of the polyether polymer in the slurry. If the amount of stabilizer to be dissolved in the polymer slurry is too small, the polyether polymer tends to be subject to gelation during storage and at shaping. In contrast, if the amount of stabilizer is too large, a solid electrolyte film made by shaping a polyether polymer composition tends to give a battery having poor performance.

For dissolving or dispersing the above-mentioned insoluble antioxidant and/or soluble stabilizer in the slurry of polyether polymer, the insoluble antioxidant and/or soluble stabilizer may be added, as they are, in the slurry of polyether polymer. However, the insoluble antioxidant is preferably added in the polymer slurry by a procedure wherein a solution, which has been previously prepared by dissolving the antioxidant in a solvent capable of dissolving the antioxidant, is mixed with the polymer slurry whereby the antioxidant is precipitated and dispersed in the polymer slurry. When the antioxidant is added by this procedure, the antioxidant is dispersed as more finely divided particles in the polymer slurry. The solvent capable of dissolving the antioxidant therein includes, for example, aromatic hydrocarbons such as toluene and xylene.

The soluble stabilizer may also be added in the polymer slurry by a procedure wherein a solution, which has been previously prepared by dissolving the stabilizer in a solvent capable of dissolving the stabilizer, is mixed with the polymer slurry. In the case when both the insoluble antioxidant and the soluble stabilizer are added, a procedure can be adopted wherein a solution, which has been previously prepared by dissolving the antioxidant and the stabilizer in a solvent capable of dissolving the antioxidant and the stabilizer, is mixed together with the above-mentioned polymer slurry.

After dispersing the antioxidant and/or dissolving the stabilizer in the polymer slurry, the polymer slurry is preferably stirred. The stirring of polymer slurry is carried out at a temperature in the range of 0 to 80° C., preferably 10 to 50° C. and for a period of 1 to 120 minutes, preferably 5 to 60 minutes.

By removing the organic solvent from the polymer slurry having the antioxidant dispersed therein and/or the stabilizer dissolved therein, a polyether polymer composition comprising the polyether polymer and the antioxidant and/or the stabilizer can be obtained. The removal of the organic solvent is preferably carried out by a procedure wherein the polymer slurry is filtered by a wire mesh filter or other filter to recover polyether polymer particles dispersed in the polymer slurry, and then the recovered polymer particles are kept under heated conditions and/or reduced pressure. When the polyether polymer is recovered as it is in a particle form, the as-recovered polymer particles are preferably dried at a temperature in the range of 30 to 45° C. under a reduced pressure. If the drying temperature is too low, the solvent is difficult to evaporate. In contrast, if the drying temperature is too high, the polymer particles are liable to adhere to each other to form agglomerates.

Polyether Polymer Composition

The polymer polyether composition of the present invention includes the following two types of compositions (i) and (ii):

(i) a polyether polymer composition, characterized by obtainable by a process wherein at least one kind of agent selected from an antioxidant which is insoluble in an organic solvent and a stabilizer which is soluble in the organic solvent is incorporated in a slurry comprising the organic solvent and a polyether polymer dispersed therein to prepare a slurry having said agent dispersed or dissolved therein; and then, the organic solvent is removed from the slurry (this type of polyether polymer composition is hereinafter referred to as "polyether polymer composition (i)" when appropriate), and (ii) a polyether polymer composition comprising a polyether polymer particle, and at least one kind of agent selected from an antioxidant which is insoluble in an organic solvent incapable of dissolving the polyether polymer particle therein, and a stabilizer which is soluble in the organic solvent, characterized by satisfying at least one of the following three requirements:

(1) at least 50% by weight of the total amount of the antioxidant in the composition is deposited on the surface of the polyether polymer particle, (2) the polyether polymer has a gel content of not larger than 5% by weight, and (3) at least 50% by weight of the total amount of the stabilizer in the composition exists within the polyether polymer particle (this type of polyether polymer composition is hereinafter referred to as "polyether polymer composition (ii)" when appropriate).

The polyether polymer composition of the present invention may be such that both the features of the polyether polymer compositions (i) and (ii) are satisfied.

In the polyether polymer compositions (i) and (ii) of the present invention, the kind of polyether polymer, the process for producing the polyether polymer, the organic solvent used for a polymer slurry, the kinds of antioxidant and stabilizer, procedure for dissolving or dispersing the antioxidant and stabilizer, and the procedure for removing the organic solvent may be the same as those which are described above with respect to the process of producing the polyether polymer composition according to the present invention.

In the case when the polyether polymer composition (i) contains an insoluble antioxidant, it is preferable that the polyether polymer is in the form of particles and at least 50% by weight of the total amount of the antioxidant in the composition is deposited on the surface of the polymer particles. In the case when the polyether polymer composition (i) contains a soluble stabilizer, it is preferable that the polyether polymer has a gel content of not larger than 5% by weight, or that the polyether polymer is in the form of particles and at least 50% by weight of the total amount of stabilizer in the composition exists within the polymer particles.

The polymer particles in the polyether polymer compositions (i) and (ii) usually have a particle diameter in the range of 0.02 to 2 mm, preferably 0.05 to 1 mm and more preferably 0.1 to 0.5 mm.

The amount of antioxidant deposited on the surface of polyether polymer particle is preferably at least 70% by weight, more preferably at least 80% by weight, of the total amount of antioxidant in the composition. With an increase of the relative amount of antioxidant deposited on the polyether polymer particle, the molecular weight reduction of polymer in the polyether polymer composition occurring during storage and at shaping can be minimized to a greater extent. The amount of antioxidant deposited on the polyether polymer particle can be determined by a method wherein a polyether polymer particle having an antioxidant deposited on the surface thereof is washed with diethyl ether to dissolve out the antioxidant from the particle surface, and then the content of antioxidant in the thus-obtained antioxidant/diethyl ether solution is determined by ultraviolet spectrophotometry.

The content of antioxidant in each of the polyether polymer compositions (i) and (ii) is preferably in the range of 0.05 to 2.0% by weight, more preferably 0.07 to 1.5% by weight and especially preferably 0.1 to 1.2% by weight, based on the polymer composition. When the content of antioxidant is too small, the polyether polymer tends to be subject to molecular weight reduction during storage and at shaping. In contrast, when the content of antioxidant is too large, a solid electrolyte film formed from the polyether polymer composition is liable to give an adverse influence on performance of a battery provided therewith.

The amount of stabilizer existing within a polyether polymer particle is preferably at least 70% by weight, more preferably at least 80% by weight, based on the total amount of stabilizer in the each polyether polymer composition. With an increase of the amount of stabilizer existing within a polyether polymer particle in the polymer composition, tendency of the gelation of polyether polymer composition occurring during storage and at shaping is reduced. The amount of stabilizer existing within a polyether polymer particle is determined by a method wherein the polyether polymer composition is washed with n-hexane to remove a stabilizer (A) deposited on the surface of a polyether polymer particle and a stabilizer (B) present independently from a polyether polymer particle, and the polyether polymer composition from which the stabilizers (A) and (B) have been removed is weighed. Then, the polyether polymer particle is dissolved in water, and a resulting aqueous solution is filtered using a filter paper, and the stabilizer on the filter paper is weighed. The amount of stabilizer existing within the polyether polymer particle can be calculated from the weight of the polyether polymer composition from which stabilizers (A) and (B) have been removed, and the weight of stabilizer on the filter paper.

The content of stabilizer in each of the polyether polymer compositions (i) and (ii) is preferably in the range of 0.05 to 2.0% by weight, more preferably 0.07 to 1.5% by weight and especially preferably 0.1 to 1.2% by weight, based on the polymer composition. When the content of stabilizer is too small, the polyether polymer tends to be gelled during storage and at shaping. In contrast, when the content of stabilizer is too large, a solid electrolyte film formed from the polyether polymer composition is liable to give an adverse influence on performance of a battery provided therewith.

The polyether polymer compositions (i) and (ii) are characterized in that the molecular weight reduction of polymer and/or the gelation of polymer, which occur during storage and at shaping are suppressed, and consequently, even when the polyether polymer compositions are shaped into a film by melt-shaping under heated conditions such as melt-extrusion, a film having good mechanical properties can be obtained. Therefore, the polyether polymer compositions are suitable as a material especially for a solid electrolyte film.

Solid Electrolyte Film

The solid electrolyte film of the present invention is comprised of a polyether polymer composition selected from the above-mentioned polyether polymer compositions (i) and (ii), and an electrolyte salt compound which is soluble in the polyether polymer composition.

The electrolyte salt compound used in the present invention is a compound capable of transferring a cation, and is not particularly limited provided that it is soluble in the polyether polymer composition used in the present invention. As specific examples of the electrolyte salt compound, there can be mentioned salts composed of an anion such as a halogen ion, a perchlorate ion, a thiocyanate ion, a trifluoromethanesulfonate ion ($CF_3SO_3^-$), a bis(trifluoromethanesulfonyl) imide ion ($N(CF_3SO_2)2^-$), a bis(heptafluoropropylsulfonyl) imide ion ($N(C_2F_5SO_2)_2^-$), a trifluorosulfonimide ion, a tetrafluoroborate ion ($BF_4^-$), a nitrate ion, $AsF_6^-$, $PF_6^-$, a stearylsulfonate ion or an octylsulfonate ion, and a cation such as cations of Li, Na, K, Rb and Cs. Of these, in the case when the solid electrolyte film is used for a lithium polymer battery, electrolyte salt compounds such as $LiBF_4$, $LiPF_6$, $LiCF_3SO_3$, $LiN(CF_3SO_2)_2$ and $LiN(C_2F_5SO_2)_2$ are preferable.

The electrolyte salt compounds may be used either alone or as a combination of at least two kinds thereof. The relative amount of electrolyte salt compound to the polyether polymer is usually in the range of 0.001 to 5, preferably 0.005 to 3 and more preferably 0.01 to 1, as expressed by the ratio of (mol number of alkali metal within the electrolyte salt compound)/ (total mol number of ether oxygen within the polyether polymer). If the relative amount of electrolyte salt compound is too large, the solid electrolyte film tends to have poor mechanical strength and low ionic conductivity. In contrast, if the relative amount of electrolyte salt compound is too small, the solid electrolytic film tends to have poor ionic conductivity, and a resulting battery is liable to have poor performance.

As a method of forming a film from the polyether polymer composition, there can be mentioned (1) a method wherein the above-mentioned polyether polymer composition and electrolyte salt compound are previously mixed together by a conventional procedure using, for example, a roll or a Banbury mixer, and then the mixture is formed into a film; and (2) a method wherein, while the total amount or parts of the above-mentioned polyether polymer composition and electrolyte salt compound are mixed, these ingredients are shaped into a film, for example, by an extruder.

The procedure for shaping into a film includes, for example, an extrusion procedure, a press-forming procedure, an injection molding procedure and a solution-casting procedure. Of these, an extrusion procedure is preferably employed in the present invention in view of the good surface smoothness of film and high productivity. The extrusion procedure for forming a film is carried out especially preferably by a die extrusion procedure using a twin screw extruder.

According to the need, the film made by the above-mentioned procedure is crosslinked whereby the physical and mechanical properties such as flexibility and mechanical strength can be more enhanced. The procedure for crosslinking the film includes, for example, procedures wherein a film made from a polyether polymer composition having a crosslinking agent previously incorporated therein is, for example, heated, or irradiated with ultraviolet rays or electronic rays. Especially a solid electrolyte film having been crosslinked by irradiation with ultraviolet rays is preferable in the present invention.

The solid electrolyte film of the present invention usually has a thickness in the range of 1 to 200 μm, preferably 2 to 100 μm and more preferably 5 to 30 μm. A too thin film is difficult to make under stable conditions. In contrast, a too thick film tends to have poor ionic conductivity and give a battery exhibiting a reduced output capacity.

The solid electrolyte film of the present invention is useful as a solid electrolyte for a battery, especially as an ionic conductive electrolyte film or cathode film for a battery.

The kind of battery provided with the solid electrolyte film of the present invention is not particularly limited, and, as specific examples thereof, there can be mentioned batteries of alkali metals such as lithium, potassium and sodium; batteries of halogenate salts such as zinc-silver chloride, magnesium-silver chloride and magnesium-copper chloride; and proton-transferring batteries such as a nickel-hydrogen battery. Of these, a lithium battery is preferable because of high voltage and high energy. The most preferable configuration of battery is such that the electrolyte does not comprise an electrolyte solution but consists of a solid polymer electrolyte.

EXAMPLES

The present invention will now be specifically described by the following examples and comparative examples, which by no means limit the scope of the invention. Parts and % in the examples and comparative examples are by weight unless otherwise specified.

Characteristics of a polymer, a polymer composition and a film were determined by the following methods.

(1) Composition of Polymer

Composition of a polyether polymer was measured by H-NMR and $C^{13}$-NMR at 500 MHz.

(2) Weight Average Molecular Weight (Mw) and Molecular Weight Distribution (Mw/Mn)

Mw and Mw/Mn were measured according to gel permeation chromatography (GPC) under the following conditions.

Apparatus: GPC system available from Tosoh Corporation
Column: G7000 HHR+GMHHR-H, available from Tosoh Corporation
Solvent: dimethylformamide (lithium bromide 5 mmol/L)
Flow rate: 1 ml/min
Column temperature: 40° C.
Standard material for molecular weight: standard polystyrene available from Polymer Laboratories Co.

(3) Content of Stabilizer within Polyether Polymer Particle

The content of stabilizer existing within a polyether polymer particle was determined by a method wherein a polyether polymer composition is washed with n-hexane to remove (a) a stabilizer deposited on the surface of a polyether polymer particle and (b) a stabilizer present independently from a polyether polymer particle, and the polyether polymer composition from which the stabilizers (a) and (b) have been removed was weighed. Then, the polyether polymer particle was dissolved in water, and a resulting aqueous solution was filtered using a filter paper, and the stabilizer on the filter paper was weighed. The amount of stabilizer existing within the polyether polymer particle was calculated from the weight of the polyether polymer composition from which stabilizers (a) and (b) have been removed, and the weight of stabilizer on the filter paper.

(4) Gel Content

A polyether polymer composition (0.2 g) and toluene (100 ml) were placed in 100 ml Erlenmeyer flask. The content was shaken at a temperature of 40° C. for 3 hours to thoroughly dissolve the soluble ingredients, and then the solution was filtered by a metal wire filter with 150 mesh size to remove a toluene-soluble ingredient. The residue on the metal wire filter was dried and weighed. The gel content is calculated as a ratio of the weight of the dried residue on the filter to the weight of original polymer.

(5) Amount of Antioxidant Deposited on Surface of Polymer Particle

The amount (%) of antioxidant deposited on the surface of polyether polymer particle based on the total weight of antioxidant in a polymer composition was determined as follows. A specific amount of polyether polymer particle having an antioxidant deposited on the surface thereof was taken and washed with a specific amount of diethyl ether to dissolve out the antioxidant from the particle surface. Then the content of antioxidant remaining in the thus-obtained antioxidant/diethyl ether solution was quantitatively measured by ultraviolet spectrophotometry to calculate the content of antioxidant dissolved in the specific amount of diethyl ether.

(6) Storage Stability and Processing Stability (a) Storage stability was evaluated by examining the reduction of molecular weight as observed after a polyether polymer composition was kept at a temperature of 40° C. for 70 hours, or measuring a gel content after a polyether polymer composition was kept in a nitrogen gas atmosphere for 70 hours.

(b) Processing stability was evaluated by examining the reduction of molecular weight as observed after a polyether polymer composition was kneaded at a temperature of 60° C. for 2 minutes by Brabender Plastometer, or measuring a gel content after a polyether polymer composition was kneaded at a temperature of 60° C. for 3 minutes by Brabender Plastometer.

The examination of the reduction of molecular weight was carried out by determining the reduction (%) of reduced viscosity due to molecular chain scission of polyether polymer. The reduced viscosity was determined by measuring the falling time of a solution of a polyether polymer composition (0.25 g) in toluene (100 g) at a temperature of 25° C. using Ubbelohde viscometer (viscometer No. 1), and calculating the reduced viscosity according to the following equation.

Reduced viscosity $(\eta sp/C) = [(t-t_0)/t_0]/0.217$ where t: falling time of polymer solution (seconds)
$t_0$: falling time of toluene (seconds)

(7) Mechanical Properties of Solid Electrolyte Film

Mechanical properties of a solid electrolyte film were evaluated by the maximum winding rate (m/min) at which a solid electrolyte film could be wound around a taking roll without occurrence of cracks nor breaking when a polyether polymer composition was formed into the film by melt-extrusion.

(8) Ionic Conductivity

Ionic conductivity was determined as follows. A solid electrolyte film was vacuum-dried at a temperature of 30° C. under a pressure not higher than 1 mmHg for 72 hours. The dried solid electrolyte film was sandwiched between platinum electrodes, and alternating current was applied at a voltage of 0.5 V and a frequency in the range of 5 Hz to 13 MHz. The ionic conductivity was calculated according to a complex impedance.

Example 1

Ethylene oxide and propylene oxide were copolymerized in n-hexane by a conventional slurry polymerization procedure to prepare a slurry of polyether (EO/PO) polymer. The polymer was comprised of 90% by mole of ethylene oxide (EO) units and 10% by mole of propylene oxide (PO) units, and had a weight average molecular weight (Mw) of 350,000 and a molecular weight distribution (Mw/Mn) of 10.2.

A solution of antioxidant (4,4'-thiobis(3-methyl-6-tert-butylphenol); "Nocrac 300" available from Ouchi-shinko Chem. Ind. Co.) in toluene with a concentration of 0.05 g/ml was prepared. The antioxidant solution was added to the above-mentioned polyether (EO/PO) polymer slurry in an amount such that the amount of antioxidant was 0.5% based on the EO/PO polymer. The mixture was stirred at 30° C. for 30 minutes to precipitate the antioxidant. The polymer/antioxidant slurry was filtered by a metal wire filter. The residue of polymer particles on the filter was vacuum-dried at 35° C. for 4 hours to give a polyether polymer composition. The polyether polymer composition contained 0.45% of antioxidant. Approximately the entire amount (i.e., more than 90%) of antioxidant was deposited on the surface of polymer particles.

Storage stability and processing stability of the polyether polymer composition were evaluated by the reduction of molecular weight. The evaluation results are shown in Table 1.

Example 2

By the same procedures as described in Example 1, a polyether polymer composition was prepared wherein the kind of antioxidant was changed to 4,4'-butylidene-bis-(6-tert-butyl-m-cresol) ("Antage W-300" available from Kawaguchi Chem. Co.) and its amount was changed to 0.4%. All other conditions remained the same. The polyether polymer composition contained 0.37% of antioxidant. Approximately the entire amount (i.e., more than 90%) of antioxidant was deposited on the surface of polymer particles.

Storage stability and processing stability of the polyether polymer composition were evaluated by the reduction of molecular weight. The evaluation results are shown in Table 1.

Comparative Example 1

To the polyether (EO/PO) polymer slurry prepared in Example 1, an antioxidant (octadecyl-3-(3,5-di-t-butyl-4-hydroxyphenyl) propionate; "Irganox 1076" available from Ciba-Geigy Japan Ltd.) was added in an amount such that the amount of antioxidant was 0.5% based on the EO/PO polymer. The antioxidant was completely dissolved in the solvent (n-hexane) in the polymer slurry. The polymer/antioxidant slurry was stirred at 30° C. for 30 minutes, and then, filtered by a metal wire filter. The residue of polymer particles on the filter was vacuum-dried at 35° C. for 4 hours to give a polyether polymer composition. The polyether polymer composition contained 0.15% of antioxidant. Approximately the entire amount(i.e., more than 90%) of antioxidant was not deposited on the surface of polymer particles.

Storage stability and processing stability of the polyether polymer composition were evaluated by the reduction of molecular weight. The evaluation results are shown in Table 1.

Comparative Example 2

The polyether (EO/PO) polymer slurry prepared in Example 1 was filtered by a metal wire filter without addition of antioxidant to the slurry. The residue of polymer particles on the filter was vacuum-dried at 35° C. for 4 hours to give a polyether polymer composition. Powdery antioxidant (4,4'-thiobis-(3-methyl-6-tert-butylphenol) was added to the polyether polymer composition in an amount such that the amount of antioxidant was 0.5% based on the EO/PO polymer. The polymer/antioxidant mixture was thoroughly mixed together to give a polyether polymer composition.

Storage stability and processing stability of the polyether polymer composition were evaluated by the reduction of molecular weight. The evaluation results are shown in Table 1.

TABLE 1

|  | Ex. 1 | Ex. 2 | Com. Ex. 1 | Com. Ex. 2 |
|---|---|---|---|---|
| Polyether polymer | EO/PO | EO/PO | EO/PO | EO/PO |
| Solvent in slurry | n-hexane | n-hexane | n-hexane | n-hexane |
| Content of antioxidant (%) | 0.45 | 0.37 | 0.15 | 0.5 |
| Amount of antioxidant deposited on polymer particle surface (%) | >90 | >90 | — | — |
| Reduction of reduced viscosity (%) |  |  |  |  |
| (a) after kept at 40° C. for 70 hrs | 0.5 | 1.2 | 20 | 35 |
| (b) after kneading by Brabender | 2 | 3 | 50 | 38 |

As seen from Table 1, in the case when a polyether polymer composition is prepared by using an antioxidant soluble in an organic solvent (i.e., n-hexane in this example) which is used in a slurry polymerization and in which the polyether polymer is insoluble, only 30% of the antioxidant added remains in the polymer composition, and approximately the entire amount of antioxidant is not deposited on the surface of polymer particles. When the polymer composition is stored for a long period or kneaded by Brabender Plastometer, the reduced viscosity of polymer is reduced to a great extent due to molecule chain scission (Comparative Example 1).

In the case when a polyether polymer composition is prepared by incorporating a powdery antioxidant in polyether polymer particles, the reduced viscosity of polymer is reduced to a great extent due to molecule chain scission during storage for a long period or at kneading by Brabender Plastometer (Comparative Example 2).

In contrast, in the case when a polyether polymer composition is prepared by using an antioxidant insoluble in an organic solvent which is used in a slurry polymerization and in which the polyether polymer is insoluble, more than 90% of the antioxidant added remains in the polymer composition, and approximately the entire amount (more than 90%) of antioxidant is deposited on the surface of polymer particles. When the polymer composition is stored for a long period or kneaded by Brabender Plastometer, the reduced viscosity of polymer is reduced only to a minor extent due to molecule chain scission (Examples 1 and 2).

Example 3

To 3,000 parts of the polyether polymer composition prepared in Example 1, bistrifluoromethylsulfonylimide lithium was added in an amount such that a ratio of (mol number of lithium atom in the electrolyte salt)/(mol number of oxygen atom in the polyether polymer) was 0.05 to give a polymer composition for solid electrolyte. The polymer composition was fed to a twin screw extruder and extruded under the following conditions.

Screw temperature: 80° C.

Rate of revolution: 150 rpm

Die temperature: 155° C.

A thus-obtained solid electrolyte film had a thickness of 20 μm. The electrolyte film had good mechanical properties. That is, when the solid electrolyte film was wound around a taking roll at a maximum winding rate (m/min) of 20 m/min, neither cracks nor breaking occurred. The film exhibited good ionic conductivity, i.e., an ionic conductivity of $1 \times 10^{-5}$.

Example 4

Ethylene oxide, propylene oxide and allyl glycidyl ether were copolymerized in n-hexane by a conventional slurry polymerization procedure to prepare a slurry of polyether (EO/PO/AGE) polymer. The polymer was comprised of 90% by mole of ethylene oxide (EO) units, 5% by mole of propylene oxide (PO) units and 5% by mole of allyl glycidyl ether (AGE) units, and a weight average molecular weight (Mw) of 350,000 and a molecular weight distribution (Mw/Mn) of 10.2.

A stabilizer (an oleic acid salt of 1,8-diazabicyclo-(5,4,0) undecene-7; "U-CAT SA" No. 106, available from SAN-APRO LIMITED) was added to the polyether (EO/PO/AGE) polymer slurry in an amount of 0.5% based on the weight of polyether (EO/PO/AGE) polymer in the slurry. The mixture was stirred at 30° C. for 30 minutes whereby the stabilizer was dissolved in the slurry. Then the slurry was filtered by a metal wire filter. The residue of polymer particles on the filter was vacuum-dried at 35° C. for 4 hours to give a polyether polymer composition. The polyether polymer in the polymer composition had a gel content of 0.3%, and the polymer composition contained 0.46% of stabilizer.

Storage stability and processing stability of the polyether polymer composition were evaluated by the measurement of gel content. The evaluation results are shown in Table 2.

Example 5

By the same procedures as described in Example 4, a polyether polymer composition was prepared wherein the kind of stabilizer was changed to tridecyl phosphate ("Adekastab 3010" available from Asahi Denka Kogyo Co.) and its amount was changed to 0.7%. All other conditions remained the same. The polyether polymer in the polymer composition had a gel content of 0.1%, and the polymer composition contained 0.65% of stabilizer.

Storage stability and processing stability of the polyether polymer composition were evaluated by the measurement of gel content. The evaluation results are shown in Table 2.

Comparative Example 3

To the polyether (EO/PO/AGE) polymer slurry prepared in Example 4, a stabilizer (2,2-methylenebis(4-methyl-6-t-butylphenol) was added in an amount such that the amount of stabilizer was 0.5% based on the EO/PO/AGE polymer. The stabilizer was not dissolved in the polymer slurry. The polymer/stabilizer slurry was stirred at 30° C. for 30 minutes, and then, filtered by a metal wire filter. The residue of polymer particles on the filter was vacuum-dried at 35° C. for 4 hours to give a polyether polymer composition. The polyether polymer in the polymer composition had a gel content of 6.5%.

Storage stability and processing stability of the polyether polymer composition were evaluated by the measurement of gel content. The evaluation results are shown in Table 2.

TABLE 2

|  | Ex. 4 | Ex. 5 | Com. Ex. 3 |
|---|---|---|---|
| Polyether polymer | EO/PO/AGE | EO/PO/AGE | EO/PO/AGE |
| Solvent in slurry | n-hexane | n-hexane | n-hexane |
| Gel content after heat-drying (%) | 0.1 | 0.1 | 6.5 |
| Gel content after kept in nitrogen atmosphere for 70 hrs (%) | 0.1 | 0.2 | 8.2 |
| Gel content after kneading by Brabender (%) | 0.2 | 0.3 | 10.1 |

As seen from Table 2, in the case when a polyether polymer composition is prepared by using a stabilizer insoluble in an organic solvent (i.e., n-hexane in this example) in which the polyether polymer is insoluble, the polyether polymer composition exhibits a gel content of larger than 5% as measured after the polymer recovered from the slurry is dried under heating. When the polymer composition is stored in a nitrogen atmosphere or kneaded by Brabender Plastometer, the gel content of polymer is increased (Comparative Example 3).

In contrast, in the case when a polyether polymer composition is prepared by using a stabilizer soluble in n-hexane, the polyether polymer composition exhibits a gel content of smaller than 5% as measured after the polymer recovered from the slurry is dried under heating. When the polymer composition is stored in a nitrogen atmosphere or kneaded by Brabender Plastometer, the gel content of polymer is increased only to a slight extent (Examples 4 and 5).

Example 6

To 3,000 parts of the polyether polymer composition prepared in Example 4, bistrifluoromethylsulfonylimide lithium was added in an amount such that a ratio of (mol number of lithium atom in the electrolyte salt)/(mol number of oxygen atom in the polyether polymer) was 0.05. Further, 3 parts of benzyl dimethyl ketal as a photopolymerization initiator was added, and the mixture was thoroughly mixed together to give a polyether polymer composition. Then the mixture was fed to a twin screw extruder and extruded under the following conditions.

Screw temperature: 80° C.
Rate of revolution: 150 rpm
Die temperature: 155° C.

A as-formed film was continuously laminated on a polypropylene (PP) film, and irradiated with ultraviolet rays. The film was peeled from the PP film to obtain a solid electrolyte film having a thickness of 20 μm. The solid electrolyte film had good mechanical properties. That is, when the solid electrolyte film was wound around a taking roll at a maximum winding rate (m/min) of 20 m/min, neither cracks nor breaking occurred. The film exhibited good ionic conductivity, i.e., an ionic conductivity of $1 \times 10^{-5}$.

Example 7

To the slurry of polyether (EO/PO/AGE) polymer prepared in Example 4, tridecyl phosphite ("Adekastab 3010" available from Asahi Denka Kogyo Co.) as a stabilizer was added in an amount of 0.7% based on the polyether polymer. Further, a solution of 4,4'-thiobis(3-methyl-6-tert-butylphenol) as an antioxidant ("Nocrac 300" available from Ouchi-shinko Chem. Ind. Co.) in toluene with a concentration of 0.05 g/ml was added to the polyether (EO/PO/AGE) polymer slurry in an amount such that the amount of antioxidant was 0.5% based on the EO/PO/AGE polymer. The mixture was stirred at 30° C. for 30 minutes whereby the stabilizer was dissolved and the antioxidant was precipitated. Then the slurry was filtered by a metal wire filter. The residue of polymer particles on the filter was vacuum-dried at 35° C. for 4 hours to give a polyether polymer composition.

The polyether polymer composition contained 0.46% of antioxidant. Approximately the entire amount (i.e., more than 90%) of antioxidant was deposited on the surface of polyether polymer particles. The polyether polymer in the polymer composition exhibited a gel content of 0%. The polyether polymer composition contained 0.67% of stabilizer.

Storage stability and processing stability of the polyether polymer composition were evaluated by the reduction of molecular weight and the measurement of gel content. The evaluation results were as follows.

| | |
|---|---|
| Polyether polymer: | EO/PO/AGE |
| Solvent in slurry: | n-hexane |
| Content of antioxidant: | 0.46% |
| Amount of antioxidant deposited on polymer particle surface: | larger than 90% |
| Reduction of reduced viscosity | |
| (a) after kept at 40° C. for 70 hours: | −0.1% *1 |
| (b) after kneading by Brabender: | 0.2% |
| Gel content | |
| (a) after heat-drying | 0% |
| (b) after kept in nitrogen atmosphere for 70 hours: | 0% |
| (c) after kneading by Brabender: | 0.1% |

Note,
*1 Reduced viscosity was increased by 0.1%.

As shown in the above results, in the case when a polyether polymer composition of the present invention is prepared by using an antioxidant insoluble in n-hexane and a stabilizer soluble in n-hexane, more than 90% of the antioxidant added remains in the polymer composition. When the polymer composition is stored for a long period, the reduction of reduced viscosity of polymer due to polymer chain scission does not occur. When the polymer composition is kneaded by Brabender Plastometer, the reduction of reduced viscosity of polymer occurs only to a minor extent. Further, when the polymer recovered from the slurry is dried under heating, and when the polymer composition is stored in a nitrogen atmosphere, the gel content of polymer in the polyether polymer composition does not increase. When the polyether polymer is kneaded by Brabender Plastometer, the gel content of polymer is increased only to a slight extent.

INDUSTRIAL APPLICABILITY

The polyether polymer composition produced by the process of the present invention is neither subject to the reduction of molecular weight due to polymer chain scission, nor readily gelled, while the polymer composition is stored for a long period as a material for forming a solid electrolyte film, or when the polymer composition is shaped into a film, for example, by a melt-extrusion procedure. Thus, the polyether polymer composition gives a solid electrolyte film having good mechanical properties and high ionic conductivity.

Therefore, the solid electrolyte film according to the present invention is suitable as solid electrolyte for a battery. More specifically the solid electrolyte film is useful as an ion conductive electrolyte film, a cathode film or an anode film for a battery.

The invention claimed is:

1. A process for producing a polyether polymer composition, characterized in that an antioxidant which is insoluble in an organic solvent selected from the group consisting of chain-like saturated hydrocarbons, cyclopentane and cyclohexane, and a stabilizer which is soluble in the organic solvent are incorporated in a slurry comprising the organic solvent and a polyether polymer dispersed therein; and then, the organic solvent is removed from the slurry.

2. The process for producing a polyether polymer composition according to claim 1, wherein a solution of an antioxidant is incorporated in the slurry to prepare a slurry having the antioxidant dispersed therein.

3. The process for producing a polyether polymer composition according to claim 1, wherein the stabilizer is at least one kind of compound selected from the group consisting of cyclic amidine salts, hindered phenol compounds, phosphorous acid ester compounds, and fatty acids having at least 5 carbon atoms.

4. The process for producing a polyether polymer composition according to claim 1, wherein the organic solvent in the slurry is a chain-like saturated hydrocarbon.

5. A polyether polymer composition, prepared in a process wherein an antioxidant which is insoluble in an organic solvent selected from the group consisting of chain-like saturated hydrocarbons, cyclopentane and cyclohexane, and a stabilizer which is soluble in the organic solvent are incorporated in a slurry comprising the organic solvent and a polyether polymer dispersed therein; and then, the organic solvent is removed from the slurry.

6. The polyether polymer composition according to claim 5, wherein the stabilizer is at least one kind of compound selected from the group consisting of cyclic amidine salts, hindered phenol compounds, phosphorous acid ester compounds, and fatty acids having at least 5 carbon atoms.

7. A solid electrolyte film comprised of the polyether polymer composition as described in claim 5, and an electrolyte salt compound which is soluble in the polyether polymer composition.

8. A polyether polymer composition comprising a polyether polymer particle, an antioxidant which is insoluble in an organic solvent incapable of dissolving the polyether polymer particle therein selected from the group consisting of chain-like saturated hydrocarbons, cyclopentane and cyclohexane, and a stabilizer which is soluble in the organic solvent, characterized by satisfying at least one of the following three requirements:
 (1) at least 50% by weight of the total amount of the antioxidant in the composition is deposited on the surface of the polyether polymer particle,
 (2) the polyether polymer has a gel content of not larger than 5% by weight, and
 (3) at least 50% by weight of The total amount of the stabilizer in the composition exists within the polyether polymer particle.

9. The polyether polymer composition according to claim 8, prepared in a process wherein an antioxidant which is insoluble in an organic solvent selected from the group consisting of chain-like saturated hydrocarbons, cyclopentane and cyclohexane, and a stabilizer which is soluble in the organic solvent are incorporated in a slurry comprising the organic solvent and a polyether polymer dispersed therein; and then, the organic solvent is removed from the slurry.

10. The polyether polymer composition according to claim 8, wherein the stabilizer is at least one kind of compound selected from the group consisting of cyclic amidine salts, hindered phenol compounds, phosphorous acid ester compounds, and fatty acids having at least 5 carbon atoms.

11. A solid electrolyte film comprised of the polyether polymer composition as described in claim 8, and an electrolyte salt compound which is soluble in the polyether polymer composition.

* * * * *